(12) United States Patent
Moon

(10) Patent No.: US 11,343,098 B2
(45) Date of Patent: May 24, 2022

(54) SYSTEMS AND METHODS OF SECURING DIGITAL CONVERSATIONS FOR ITS LIFE CYCLE AT SOURCE, DURING TRANSIT AND AT DESTINATION

(71) Applicant: Whitestar Communications, Inc., Apex, NC (US)

(72) Inventor: Billy Gayle Moon, Apex, NC (US)

(73) Assignee: Whitestar Communications, Inc., Durham, NC (US)

(*) Notice: Subject to any disclaimer, the term of this patent is extended or adjusted under 35 U.S.C. 154(b) by 325 days.

(21) Appl. No.: 16/518,406

(22) Filed: Jul. 22, 2019

(65) Prior Publication Data

US 2021/0028940 A1 Jan. 28, 2021

(51) Int. Cl.
*H04L 9/32* (2006.01)
*H04L 9/08* (2006.01)
*H04L 9/40* (2022.01)
*H04L 29/06* (2006.01)

(52) U.S. Cl.
CPC .......... *H04L 9/3228* (2013.01); *H04L 9/0872* (2013.01); *H04L 9/0894* (2013.01); *H04L 63/101* (2013.01)

(58) Field of Classification Search
CPC ... H04L 9/3228; H04L 9/0872; H04L 9/0894; H04L 9/14; H04L 63/101; H04L 63/126; H04L 63/0442
See application file for complete search history.

(56) References Cited

U.S. PATENT DOCUMENTS

| | | | |
|---|---|---|---|
| 6,711,264 B1* | 3/2004 | Matsumoto | H04L 9/0891 380/277 |
| 7,181,017 B1 | 2/2007 | Nagel et al. | |
| 8,724,815 B1* | 5/2014 | Roth | H04L 63/062 380/270 |
| 2005/0257057 A1* | 11/2005 | Ivanov | G06Q 20/383 713/171 |

(Continued)

OTHER PUBLICATIONS

Dissenter, Frequently Asked Questions at https://dissenter.com/help/faq, Apr. 16, 2017.

(Continued)

*Primary Examiner* — Robert B Leung
(74) *Attorney, Agent, or Firm* — Deepali Brahmbhatt; Devlin Law Firm LLC

(57) ABSTRACT

The systems and methods of securing digital conversations for its life cycle, comprising: establishing a secure channel on a private network to receive communication on a first profile from another profile on a whitelist using alias and digital keys; establishing a cryptographic key that is of a length that is supported by the computing device of the first profile; sending an encrypted conversation with digital signature using a first temporal key of detected cryptographic key length to a second profile; storing the sent conversation in a digital vault with the first temporal key; receiving an encrypted response with digital signature using a second temporal key from the second profile; decrypting the response after validating the digital signature; re-encrypting the response with a third temporal key; storing the re-encrypted response in the digital vault with the third temporal key.

14 Claims, 9 Drawing Sheets

(56) References Cited

U.S. PATENT DOCUMENTS

| | | | |
|---|---|---|---|
| 2007/0269041 A1* | 11/2007 | Bhatnagar | H04L 9/0825 380/30 |
| 2009/0254750 A1 | 10/2009 | Bono et al. | |
| 2010/0162388 A1* | 6/2010 | Baugher | H04M 1/66 726/19 |
| 2011/0270748 A1 | 11/2011 | Graham, III et al. | |
| 2014/0032733 A1 | 1/2014 | Barton et al. | |

OTHER PUBLICATIONS https://www.web2pdfconvert.com/, 2018.
https://www.codester.com/items/13206/web2pdf-ios-source-code, 2018.
Zeroisation at https://en.wikipedia.org/wiki/Zeroisation, 2018.
IBM Az/OS Cryptographic Services, Integrated Cryptographic Service Facility, Application Programmer's Guide, p. 50, 2011.
FIPS PUB 140-2, May 25, 2001.
DIBS at https://github.com/emin63/dibs, 2014.
https://github.com/afonsocastro96/SDIS-Project2,2016.
https://sourceforge.net/projects/p2pbackupsmile/, 2010.
http://www.infostor.com/nas/58-top-open-source-storage-project-1.html, Dec. 26, 2013.
CDN disclosed at https://en.wikipedia.org/wiki/Content_delivery_network, 2015.
BitTorrent Speed to Strengthen BitTorrent Protocol, Connect users with (BTT) tokens, McBrown, Jan. 17, 2019 at http://blog.bittorrent.com/2019/01/17/bittorrent-speed-to-strengthen-bittorrent-protocol-connect-users-with-btt-tokens/.

* cited by examiner

SYSTEMS AND METHODS OF SECURING DIGITAL CONVERSATIONS FOR ITS LIFE CYCLE AT SOURCE, DURING TRANSIT AND AT DESTINATION

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The following Whitestar Communications, Inc.'s concurrently filed patent applications are incorporated herein by reference: (1) Ser. No. 16/518,491, titled "SYSTEMS AND METHODS OF SALUTATION PROTOCOL TO COMMUNICATE USING A PRIVATE OVERLAY PEER TO PEER NETWORK." and patent application Ser. No. 16/518,292; (2) Ser. No. 16/518,491, titled "SYSTEMS AND METHODS OF COLLABORATIVE APPLICATION ON A PRIVATE NETWORK"; (3) Ser. No. 16/518,538, titled "SYSTEMS AND METHODS OF ENFORCING COMMUNICATIONS SEMANTICS ON A PRIVATE NETWORK"; (4) Ser. No. 16/581,586, titled "SYSTEMS AND METHODS OF GESTURE TRIGGERED AUTOMATIC ERASURE ON A PRIVATE NETWORK"; (5) Ser. No. 16/518,630, titled "SYSTEMS AND METHODS OF DISTRIBUTED BACKUP AND RECOVERY ON A PRIVATE NETWORK"; and (6) Ser. No. 16/518,706, titled "SYSTEMS AND METHODS OF DELEGATION OR REPLICATION ON A PRIVATE NETWORK."

FIELD OF THE INVENTION

The present invention is in the technical field of establishing and controlling conversations in social media with the use of secure and encrypted private networks. More particularly, the present invention is in the technical field of secure communications that are encrypted at source, in transit and at destination. More particularly, the present invention is in the technical field of retaining control, edition, modification and/or deletion rights to the original author of the content.

BACKGROUND

Current social media systems are enabled by central services provided by third parties. In essence, social media is interaction between two or more end-users that mirrors real-life situation where a third-party has no business interfering. But the digital world of the internet applications of social media do not align to the real-world frameworks.

Social media typically facilitates user-generated content including text, comments, photos, videos and voice. Traditionally these various media are generated through "online" interactions and are facilitated by one or more third party platforms such as Twitter, Facebook, Youtube, SnapChat, Instagram, Weibo, LinkedIn and many others.

In traditional social media systems, users create profiles via a service providers website or app and all the content is maintained, processed and stored by the social media company. In such systems, users rely on the social media companies to store and protect their sensitive user data both while in flight, i.e. in transit and at rest, i.e. either at source or destination.

While users don't pay "directly" for use of these services, the services providers generate revenue from its user content and meta data through directed ads and selling access to their subscribers content for data mining or harvesting. This revenue then offsets the cost of maintaining the centralized servers and data centers and in some cases returns dividends to their shareholders.

Unfortunately, there are a number of serious drawbacks to this architecture. Most notably is the broken business model that requires the service provider to monetize their customers, which in turn requires their customers to give some, if not all of their privacy.

Additionally, the service provides have recently gone into censorship or "de-platforming" of content based on their or their advertisers best interests and not necessary the interest of their users or user communities. In some cases the censorship is at the direction of a central government but in most cases it is carried out based on arbitrary decisions of the social media service provides.

Complicating the matter, should a competitor wish to enter the market to compete against the entrenched social media companies it takes tremendous capital to build out the data centers and facilities to onboard even a single user. As users join the new network, more resources must be added to the central networks to manage the traffic load and to store the content being created by their users. At the end of the day, the new social media company would once again have to monetize their customer base, solicit advertisers and adhere to government oversight. While the new company might impose a different set of censorship policies than the legacy companies its still censorship by a third party and not by end users.

Further, social media companies typically deploy simply one-way authentication and HTTPS to secure their user's data in flight. Many enterprise networks (as well as others) are able to put a "man in the middle" of such traffic using an HTTPS proxy, thus exposing all data in flight to the intermediary and allowing that intermediary to filter, read, copy and save user content without them being aware of it.

One-way authentication only authenticates or assures the user that when they connect to a sight that "claims to be" say instagram, that in fact it is instagram. The converse is not true. The cryptographic system does not authenticate the client software used by the user and therefore must trust higher level protocols to assure that a user that claims to be user A is in fact user A, for example through passwords or other means.

Both sets of "keys", the ones that attest to the service provider's identity and the passwords used by the "user" are not changed very often, and can actually not change for years. This means that if either key is broken, that all the user's or even sights' data can be exposed. Breaking the keys to access a sights meta data can expose all data of every user in the system. Breaking a given user's key can expose all of a user's stored content.

In summary, the current architecture of social media tends to lead to: (i) Third party censorship, sometimes legally, sometimes not; (ii) Lack of Privacy either on purpose or by accidental exposure; and (iii) Lack of free association.

The last point, lack of free association can best be understood by the fact that the social media companies can and do decide what user can and can not participate in their platform. Worse is that while excluding one user A from freely joining a given community and conversing with members of that community, the same platform may allow other members to make almost any claim about user A without allowing user A the ability to refute those claims. This leads to very bad social norms in which gangs of denizens roam from social media site to social media site spreading false or unsubstantiated claims about user A without user A being able to defend herself on any of those platforms.

Furthermore, because the user's content is held by a third party and the social media companies routinely change their terms of services, most users are unaware that their content may be retained or archived, indefinite. A frivolous statement which is deemed "social acceptable today" may be judged years into the future by a new set of standards and lead to harsh consequences including ability to get into schools and colleges, ability to get a job, ability to run for public office, etc. We call this effect "Future Guilt."

Still further problems exist in the semantics of existing social interactions on social media sites. When someone creates content, they don't "own" that content, the social media company does. Even with as simple as email, "ownership" of content is fluid and the semantics of "polite" conversation are not a part of the system.

For example, if user A creates an email message and sends it to user B and in that email, user A included content that she did not want to disclose to anyone else, there is nothing in the art that would prevent user B from saving that information away, copying it or forwarding it to someone else like user C. Neither is user B prevented from replying to user A and copying additional users D, E, etc. on that reply. This sort of "lack of control" of content is pervasive in today's social media systems and this leads to a lack of polite discourse amongst members of society.

With the explosion of Internet of Things (IoT) devices, the number of devices connecting on the internet are exploding. It is unreasonable to expect any single device, for example, to have equal probability of connecting with another IoT device next to it or a personal computer remotely located in Mongolia. The current internet and networked communication do not align to the way society or human behavior operates. There are no digital equivalents that promotes good behavior in a digital or online environment that are cultivated based on existing social norms.

The current public networks assume uniform packet distribution that cannot be converged. Security is also an issue because any computing device can send a packet to any other device. The approaches to resolve digital spam including email or text spam are based on prevention and not fixing the root cause of the problem, i.e. openness of receiving packets from unauthenticated senders.

SUMMARY OF THE INVENTION

The present invention is systems and methods of securing digital conversations for its life cycle, comprising: establishing a secure channel on a private network to receive communication on a first profile from another profile on a whitelist using alias and digital keys; establishing a cryptographic key that is of a length that is supported by the computing device of the first profile; sending an encrypted conversation with digital signature using a first temporal key of detected cryptographic key length to a second profile; storing the sent conversation in a digital vault with the first temporal key; receiving an encrypted response with digital signature using a second temporal key from the second profile; decrypting the response after validating the digital signature; re-encrypting the response with a third temporal key; storing the re-encrypted response in the digital vault with the third temporal key.

The systems and methods of securing digital conversations for its life cycle, further comprising: rekeying the digital keys of one or more profiles is triggered using one or more of the following: at discretion, automatic based on time or geographic location, manual, on detection of threat.

The systems and methods of securing digital conversations for its life cycle, further comprising: rekeying all the profiles on the private network.

The systems and methods of securing digital conversations for its life cycle, wherein the cryptographic key length is customizable by a user within the range supported by the computing device.

The systems and methods of securing digital conversations for its life cycle, wherein the digital vault is a smart wallet using multiple keys.

The systems and methods of securing digital conversations for its life cycle, further comprising: preventing anonymous conversations on the private network.

The systems and methods of securing digital conversations for its life cycle, wherein the digital vault is a secure vault using PKCS12 key store.

The systems and methods of securing digital conversations for its life cycle, wherein the conversation and response include one or more of the following messages: Short Message Service, Multimedia Messaging Service, texting, voice, video, digital content, or any form of internet protocol based underlay network.

The systems and methods of securing digital conversations for its life cycle, further comprising one or more of the following: deleting one or more exchanges originating from the second profile from the private network; or deleting the conversation and all related exchanges from the private network.

The systems and methods of securing digital conversations for its life cycle, further comprising: indexing based on time, source or topic conversations and related exchanges.

BRIEF DESCRIPTION OF THE DRAWINGS

The embodiments of this invention are illustrated by way of example and not limitation in the figures of the accompanying drawings, in which like references indicate similar elements and in which.

DETAILED DESCRIPTION OF THE INVENTION

Figure 1:
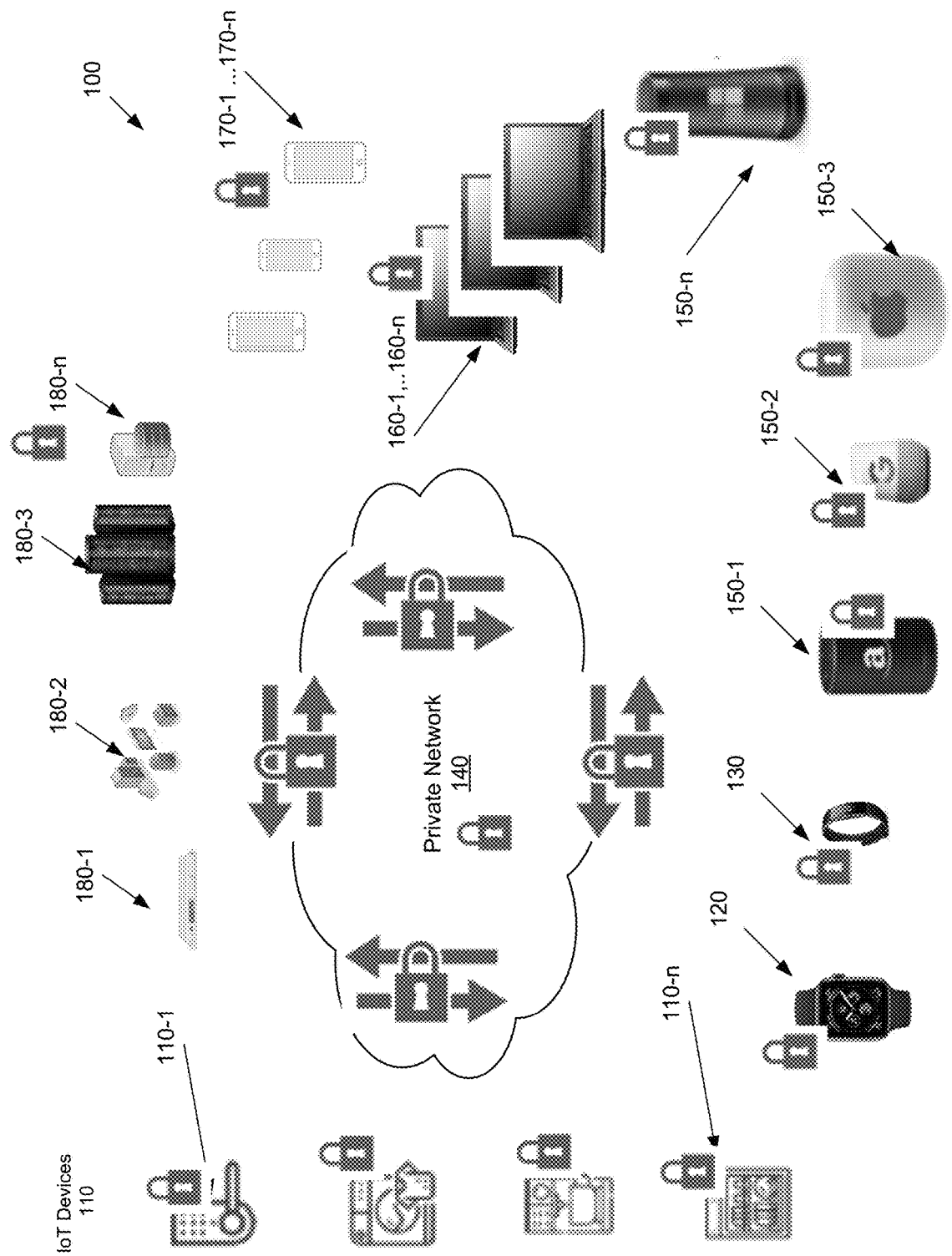
FIG. 1 shows a diagram illustrating an example of systems and methods of securing digital conversations for its life cycle with different types and categories of computing devices including internet of things devices.

The systems and methods of securing digital conversations for its life cycle includes techniques to establish control to edit, modify and delete them from its source, in transit and at its destination including all copies on a private network. The conversations, messages and all of its underlying content is part of secure objects at end points or while in transit that comply with rules, policies and restrictions on the private network. Users do not relinquish control to a central authority, or third party, who may run a service on a server. The originator retains control through the life cycle allowing a de-centralized hierarchy that promotes good behavior in the digital world.

The systems and methods of securing digital conversations for its life cycle provides for a completely distributed social media platform that allows both humans and machines to freely associate with one another assuming a trusted relationship with a secure channel is already established between the parties exchanging the information. In this platform, there is no central service. There is no cost to stand up the platform. There are no additional costs as each new user joins the social network. Instead of a central services storing user content and facilitating user content distribution and subsequent storing or recording, all these facilities are provided in a peer to peer social network by the users themselves.

No central authority can prevent the users from freely associating with one another or can exclude a given user from participation in social media with this system.

The systems and methods of securing digital conversations for its life cycle, discloses a novel cryptographic system in which all content is protected while in flight and when at rest. In this system, each unit, or message that is transferred between any two users is encrypted and signed one way with a different secrete key being used for each message. Upon receipt, the receiving part can check the signature of the sender, validate if the send is known to the receiver and that the signature is good and then decrypt the message and re-encrypt it into a special "vault" to be used to store that message on the receiver's device. Again, each message is store in its own vault with its own key.

The advantage of this system is that should someone break the keys for one message, that same key cannot be used to decrypt any other message in the system, as each message is unique. Also, keys are changed for each and every message in flight and at rest rather than remaining static fora long period of time.

First understand that we call a device, with our application and either a machine (like an IoT device) or human associated with it an "endpoint." So endpoints can be humans or machines operating our application on a computing device.

Now each endpoint in the system is assigned a public/private key pair by the application. At any point the key pairs may be updated or amended either automatically or at a user's direction. Several generations of key pairs for a given endpoint are allowed to be in the social network at the same time.

For each keypair, the private key is store on the endpoint in a special cryptographically secure vault. In one embodiment, the vault uses PKCS12 key store, which is known in the art as a secure means of storing private keys. Other key stores may also be freely used. Unlike the private key, the public key is store in the endpoint object and may be distributed to another user that one wishes to communicate with.

Because out system does not rely on a centralized public key infrastructure, there is no "trusted third party" in the system. Trust is built pairwise between two users and only they have each other's keys. No "man in the middle" software can intercept and inspect their traffic. Therefore, in order for peer's to communicate in the system, they must have a "copy" of their counterparts endpoint information, including their counterpart's public key and identity.

User A and User B can establish each other in a trusted relationship that allows communication between the two using authenticated, secure and encrypted messaging in a secure channel. At the time of establishing a relationship, user B would include among other things, the public key of user B as well as one or more network addresses, for example, an ip address that user A can use to send messages to user B. A person of ordinary skill in the art would understand that the private network only allows communication between already established trusted relationships.

User A would send an encrypted endpoint message to user B also containing, amongst other things, the public key of user A. Each party now has the ability to send information to the other party, directly, peer to peer via the counter parties IP address, again without the aid of a central service.

The secure messaging protocol, according to one embodiment, that allows control of digital conversations for its life cycle includes the following steps. Using the public/private key pair, the endpoints can both secure data at rest on their own device and secure data in flight as it is being transferred between devices. Let us first show how data is secured in flight.

If a message M1 is to be sent from user A to user B then: First, first user A extracts the endpoint object of user B from User's A's payload vault. The following sub-steps occur: (i) First user A reads in the encrypted payload vault containing the endpoint object of user B from non-volatile memory into memory. (ii) Next, user A extracts a reference from the vault that tells user A which keypair from user A's set of keypairs was used to secure the vault. (iii) Next user A selects a cryptographic algorithm in one embodiment is the AES algorithm which is known in the art. (iv) Next user A extracts an encrypted temporal key which was stored in the vault and then uses user A's private key associated with the keypair selected to decrypt the encrypted temporal key. (v) Finally user A uses that key and the selected algorithm (AES) to decrypt the payload from the payload vault. The payload in this case contains the decrypted endpoint object of user B.

Second, now user A selects a public key from and alias from the endpoint object of user B to use to secure the message to be sent. It includes the following sub-steps: (i) To do this, first user A selects a new temporalKey using a cryptographically secure algorithm such that there is no way to predict what the next key will be. This key will be used for the cryptographic algorithm that is selected, for example, AES. (ii) Next user A encrypts the temporal key using the public key selected from user B's endpoint object. Note that only user B's private key will be able to decrypt the temporal key. (iii) Next user A uses the selected cryptographic algorithm (AES) and temporal key to encrypt the payload of the message to be sent to user B. (iv) User A signs the message using one of user A's private key's and then user A stores the alias of which private key was used to sign the message. (v) Finally, user A marks the message as being from User A. (vi) Then using one of the IP addresses associated with user B's endpoint object, user A sends the encrypted packet to user B. For example, using TCP, but other protocols could also be used.

Third, now when user B receives a packet, in this case from user A, then user B must validate, decrypt and store the message. (i) First, using the identity of user A store in the packet, user B selects the payload vault from his file system that contains the endpoint object of user A and decrypts the message in the same way as outlined above about how user A decrypts user B's endpoint object. (ii) Next, user B selects the public key from user A's endpoint object that is associated with the alias indicated in the message. Using that public key, user B computes and validates that the signature of the message is correct. This assures user B that in fact user A and only user A could have sent the message. (iii) Next user B uses his private key associated with the payload alias selected by user A and stored in the payload object. (iv) Using the private key, user B then decrypts the temporal key that user A selected for this message. (v) The using the selected crypto algorithm (AES), user B decrypts the payload of the message. (vi) Finally user B extracts the decrypted message from the payload.

Last, finally, user B encrypts the message payload into a payload vault so that it can be stored on his local device. It includes the following sub-steps: (i) To do this, user B selects one of his keypairs to secure the message. (ii) User B then notes the alias of the keypair used. (ii) User B then generates a cryptographically secure temporal key for the vault. (iv) User B then encrypts that temporal key and save it in the vault. (v) User B then encrypts the message payload using the temporal key and adds the encrypted payload to the vault. (vi) Finally, User B can save the message to non-volatile memory for later retrieval.

In one embodiment, the secure messaging protocol performs rekeying using the following steps. At any time, any device may select a new keypair (public/private.) In doing so, the new keypair is assigned an alias. The private key is added to the private key store of the user. The user then extracts his endpoint object from a payload vault by decrypting it using the keypair that was used to secure that message. The user then adds the new public key to the endpoint model and then arranges to send a copy of the revised endpoint model to every counterpart that that user has established a social network with.

From that point forward, counter parts of the user's social network may either use one of the old keys known by their alias or the new key, but should generally migrate to the newest key when available.

The user then starts a process to work its way through all messages stored in payload vaults on non-volatile storage. For each vault, the user's application reads in the message using its old key and then re-encrypts the message with a new temporal key and new public key so that eventually all messages store on the user's device will utilize the newly selected keypair.

In one embodiment, the data in flight, i.e. in transit, has the following parameters. When sending objects between endpoints, all objects are encrypted as described above and contained within a special "packet" object. Each packet object is unique as each message contains a unique temporal key and may be transmitted between different parties.

A packet object contains the following information fields: (i) The endpoint ID of the endpoint that sent the message. The endpoint ID is unique in the world, (ii) The alias of the public/private key on the destination device that the sender has selected to use to secure the payload of the packet. (iii) An encrypted signature that can be used for two purposes. First, it assures that the payload has not been tampered with. Secondly, it can be used to assure that the sender, as identified by the endpoint ID, is in fact the one that sent the message. The signature is contained within a variable length byte array. (iv) The encrypted temporal key. This is an encryption key that has been encrypted with the public key associated with the alias of the public/private key pair of the receiving device and stored in a byte array of arbitrary size. (v) The encrypted payload. This is a byte array that contains a payload object that has been encrypted using the temporal key.

The payload object, once decrypted, contains the following information fields: (i) A command, which indicates what kind of action, should be carried out by the receiving part. Commands include such actions as saving a new endpoint or message or conversation or remove them, among many other actions. (ii) An object or object reference associated with the action, which might be an actual object or a reference to an object in the form of an object ID. Objects might include endpoints, conversations or messages.

In one embodiment, the data at rest has the following parameters. When an object has been received by an endpoint from another endpoint or created locally it is saved to flash or similar non-volatile storage in a special object called a Payload Vault and then written out to flash. The payload vault object has the following information fields: (i) An alias that can be used to determine which of many public/private key pairs was used to encrypt the play of the object. (ii) An encrypted temporal key. The temporal key is used to encrypt the actual payload of the object. (iii) The encrypted payload. The payload as described above, that has been encrypted with the temporal key.

Different embodiments described herein include components or structures to perform the described functionality. A "component" or a "module" as used in this invention disclosure, includes a dedicated or shared processor and, typically, firmware or software modules executed by the processor. Depending upon implementation-specific or other considerations, a module can be centralized or its functionality distributed. A component or a module can include special purpose hardware, firmware, or software embodied in a computer-readable medium for execution by the processor.

In one embodiment, FIG. 1 depicts a diagram 100 illustrating an example of securely connecting computing devices through the private network as well as storing information securely on the computing devices before or after each transmission. In the example of FIG. 1, the environment includes a first IoT devices 110-1 through an nth client system 110-n, private network 140, a smart watch 120, a fitness tracker 130, intelligent voice assistants 150-1 to 150-n, personal computers from 160-1, . . . 160-n, smartphones from 170-1 to 170-n, servers from 180-1, . . . 180-n.

In an implementation, the IoT device 110 includes components related to network connectivity. In one implementation, the IoT device 110 includes speaker and/or microphone hardware and software components to enable receipt and execution of speech commands directly on the device. In another implementation, the IoT device 110 does not include a speaker and/or microphone capability to enable receipt and execution of speech commands directly on the device, yet the IoT device is able to communicate with the private network system to enable receipt and execution of speech commands translated to device specific SDK/API commands.

The data, information or content flow through and from these devices through the private network is always through secure channels that authenticate the sender, are encrypted per one-way transaction using temporal keys and when received are verified for digital signatures to ensure that the content has not changed in transit. After decryption at the receiver, the content is recorded or stored using receiver side temporal keys. The sender maintains control of data even when at receiver device by the ability of encapsulation in objects that comply with edit, modify and delete commands. When users comply within the system, the objects provide hooks and application programming interface that allows the originator of the content to be the owner of the content for its life cycle. Content may be redistributed in the private network but that does not change the originator's control on the content.

For example, if a celebrity by accident sends a message that he or she later regrets, the private network allows the celebrity to delete such content through-out the system. This enables the celebrity to avoid embarrassment on public leakage of news or disclosure of the content. Private network is based on followers that are trusted. Followers of the celebrity who violate rules can be given warnings and eventually revoked from the private network by ending the trust relationship. This promotes good behavior that is aligned to the real-world social controls.

The system provides protection from intermediaries including hackers using digital security means that are known to a person of ordinary skill in the art using a private network environment that complies with trusted relationship rules. A hacker cannot hack into the information or content when at rest on the device at source or destination. The hacker cannot hack into the information when the information is in transmission.

Information can be designated as stale and meaningless when not relevant by the originator. The originator has full control to delete the information from all of the recipient nodes on the system. This prevents using information against the originator years later when it has the risk of being used out of context. The system promotes individual rights and control and removes interference from third parties including governments. The system gives an individual a digital voice that is safe and secure. It is well established in the industry that an individual can speak freely only when there is no fear of repercussions.

The role of the computing device manufacturers is separated from the use of the computing devices. After purchase, a user of the computing device has control on how to use, configure and communicate using that device. Use of any central services including those from the device manufacturer become optional. In one embodiment, there are one or more aliases associated with each of the computing devices including the IoT devices. The IoT devices integrate with the private network with zero additional programming. Different categories of smart watches 120, fitness trackers 130, personal computers 160 are connected securely and with encryption. The Intelligent voice assistants 150 can be from a variety of providers like Amazon Alexa, Google Home Assistant, Apple HomePod, Microsoft Cortana etc. Smartphones 170 and servers 180 with more computing power, bandwidth and capabilities are also connected. For example, the smallest computing device, i.e. an IoT doorbell ring to the largest computing device, a full-fledged server, are both treated equal in the digital private network world.

A user profile may be associated with one or more aliases. The smallest building brick for the private network is an alias. With the evolution of smarter devices and use of artificial intelligence, an alias may be given the capability to automate and make some of its own decisions. By default, communication occurs only with devices that you choose too and not with any random device on a public network or the internet.

In one embodiment, a single alias is associated with a single computing device. A user or owner has access to the private key associated with the public/private key for that alias. For devices that are co-owned, two or more user profiles may have access to the same alias profile. In one embodiment, a private network is associated with all aliases that a user owns.

A person of ordinary skill in the art would appreciate that by encapsulating information or data in objects that follow default rules, the secure and encrypted private network operates freely without a fear of malicious attacks or abuse related to misuse. An originator can create content that he or she desires to make public and distribute freely. An originator can then customize the rules for the object holding the content accordingly. The originator retains control to change his or her mind and totally delete or erase such content from all of its recipients.

Computing devices irrespective of their size, category or applications have powerful computing capabilities in terms of processing power and also have network bandwidth to connect. The systems and methods of modeling private network allow for these computing devices to connect seamless in a secure and encrypted manner after authentication. Each transaction is an authenticated exchange. Such exchanges eliminate spam. An unwanted sender is revoked from the whitelist of authenticated senders and cannot send spam.

A person of ordinary skill in the art would appreciate that two aliases communicating with each other have equal rights and access. Both the aliases require permission with each other to enter into a relationship and start a conversation through a secure channel. Either one of the alias can decide to terminate the relationship and revoke the established trust. These exchanges mirror the scenarios of communication in real life.

Private Network 140 can be different wireless and wired networks available to connect different computer devices including client and server systems. In an implementation, private network 140 is publicly accessible on the internet through secure messaging protocol described herein. In an implementation, private network 140 is inside a secure corporate wide area network. In an implementation, private network 140 allows connectivity of different systems and devices using a computer-readable medium.

The messaging and notification between different components can be implemented using application programming interface (API) calls, extensible markup language ("XML") or Javascript Object Notation ("JSON") config file interfaces between different interfaces, Hypertext Preprocessor (earlier called, Personal Home Page) ("PHP"), Python, Node.js, Java/C++ object-oriented programming or simple web-based tools.

Different components may also implement authentication and encryption to keep the data and the requests secure. Authentication of a device may be accomplished using public/private key, passwords, token, transaction, biometrics, multi-factor authentication or other methods known in the industry. Encryption may use data encryption standard (DES), TripleDES, RSA, Advanced Encryption Standard (AES) or other methods known in the industry.

Figure 2:
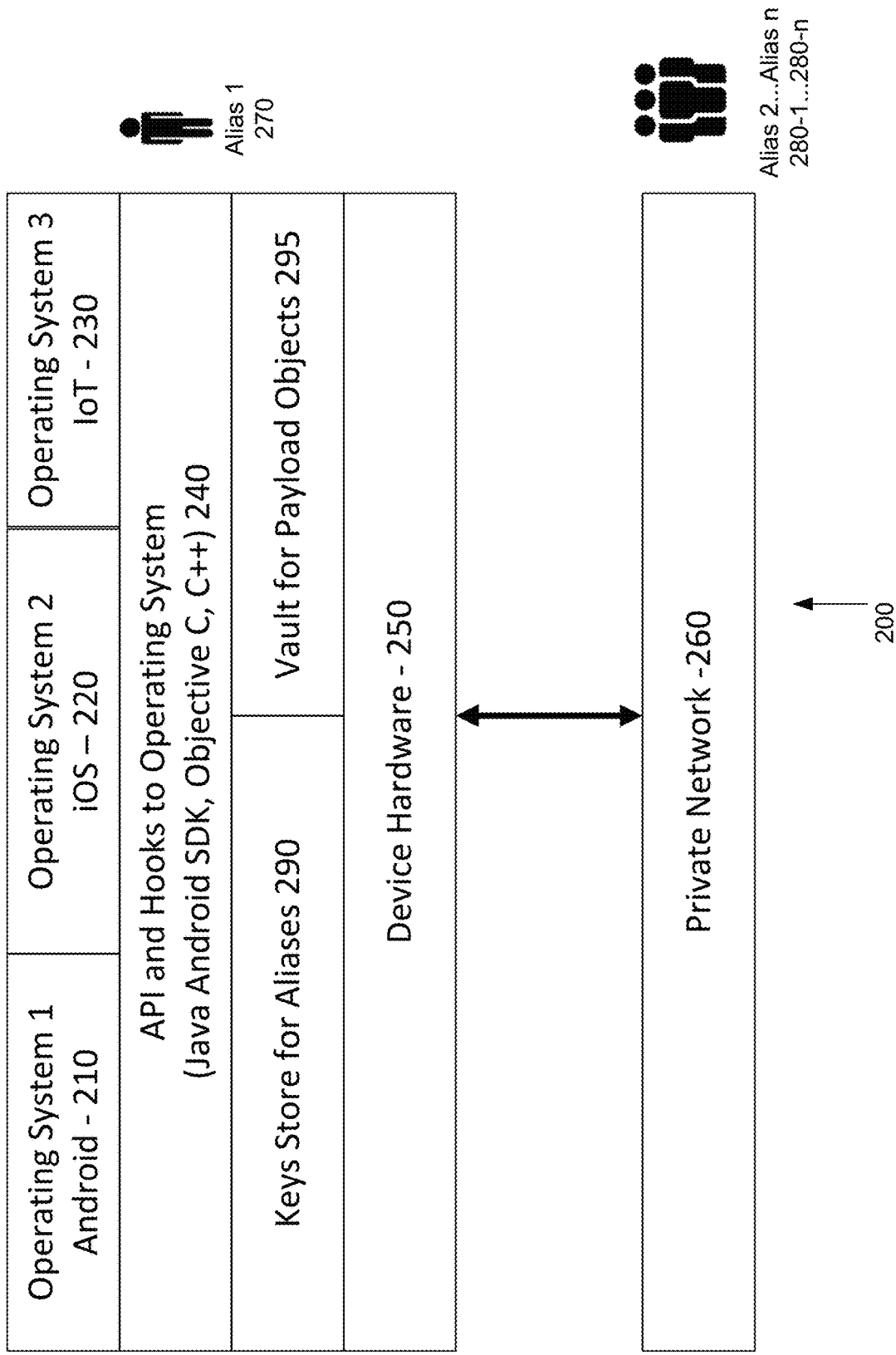
FIG. 2 shows an exploded view of a computing device with overlay network, according to one embodiment.

FIG. 2 is an exploded view 200 of different versions of an implementation that allow application programming interface, hooks, or overlay network connections in a computing device. For example, Alias-1 270 is associated with a computing device that may have one or more operating systems including Android 210, iOS 220 or IoT operating system 230. The computing device includes device hardware 250 that can be controlled by the private network API/hooks 240 that are incorporated at a system level on the computing device. In one embodiment, depending on the computing device platform the private network overlay hooks are implemented using Java Android SDK, Objective C, or C++. In one embodiment, any and all communications are controlled using the private network overlay architecture. In one embodiment, a user can customize the alias to go in and out of the private network overlay architecture mode. The private network 260 includes other trusted alias 2 to alias n i.e. 280-1 to 280-n all of which can communicate with Alias-1 using authenticated, secure and encrypted channels. In one embodiment, the overlay network is based on peer to peer network. In one embodiment, the private network using an overlay network using the existing public network.

In one embodiment, the computing device includes a module for key store for aliases 290. A person of ordinary skill in the art would understand that an alias is a smart identity association for the computing device. A single computing device can have multiple aliases that can be used to associate and connect with different private networks. A single computing device may have a single alias that connects to two or more private networks. A single computing device may have two or more aliases that connect to the same private network. Aliases can be revoked, rekeyed and recycled allowing alias management to be dynamic that adds further security to the configurations of private networks.

In one embodiment, the computing device includes a vault 295 for payload objects from the private network. A person of ordinary skill in the art would understand that information of or related to the private networks exists only within secure objects that are payload for the vault. A person of ordinary skill in the art would understand that the key store 290 could be merged with the vault 295 function or kept as separate module or component of the computing device 200. The vault allows system wide rules and policies including giving control to the originator of the information to delete the content system wide. Because information is always in encrypted form using temporal keys even for local storage, a hacker cannot decrypt the information. Even if one key is lost by accident, only a small amount of data related to that particular key is at risk. Once a user knows that a key was lost, he or she can decide to rekey that portion of the data or rekey all the data on the computing device or rekey system-wide all the data originating from that user. In one embodiment, rekeying the digital keys of one or more profiles is triggered using one or more of the following: at discretion, automatic based on time or geographic location, manual, on detection of threat.

Figure 3:
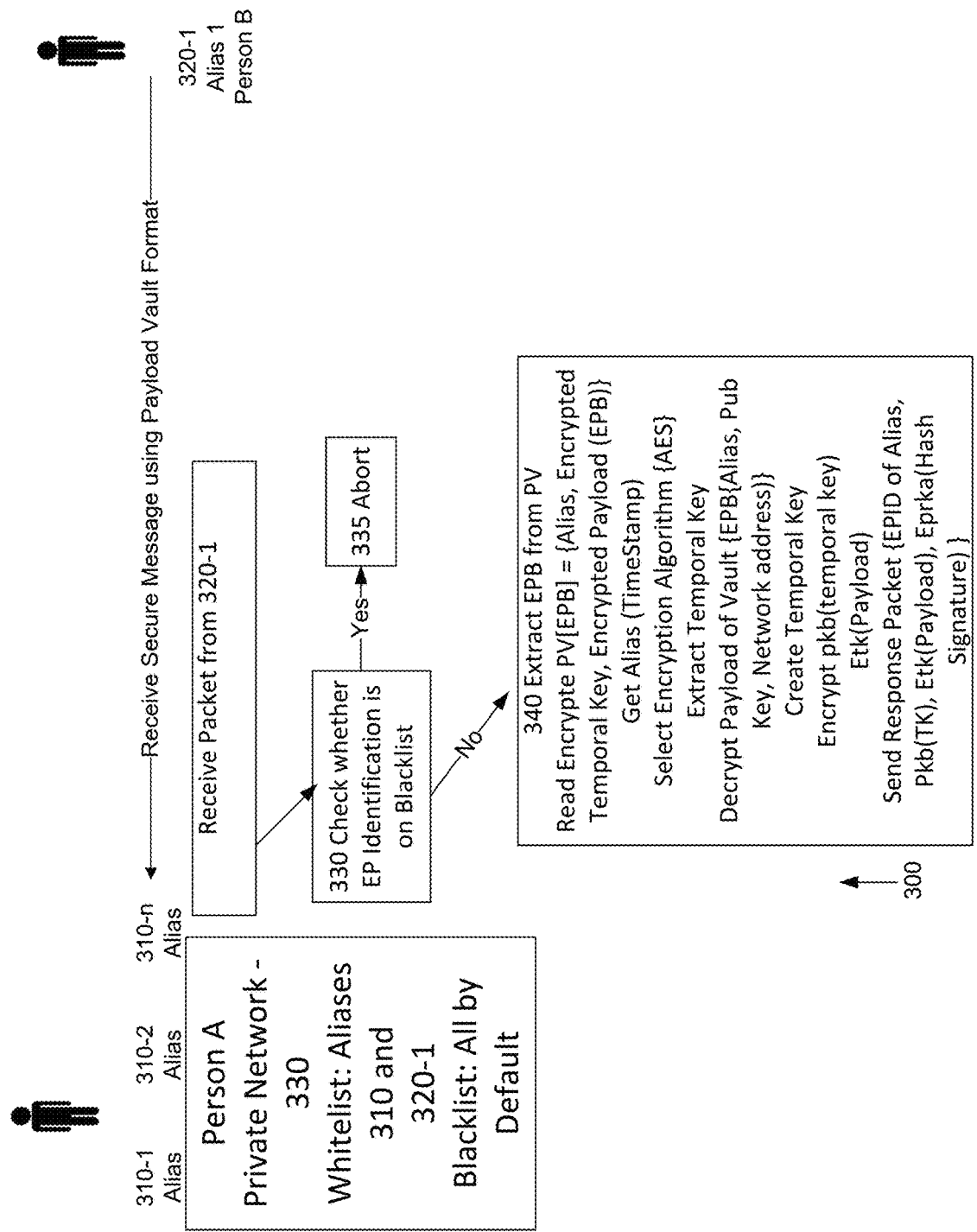
FIG. 3 is an exploded view of initial secure messaging protocol, according to one embodiment.

FIG. 3 outlines 300 the first stage of the secure messaging protocol to exchange information after a trusted relationship between two aliases is already established. Aliases 310-1, 310-2, . . . 310-n belong to user 310 who owns one or more computing devices. Private network 330 access is controlled by user 310 using his whitelist that includes all of 310 Aliases and Alias 320-1. All other devices are blacklisted by default. Alias 310-1 receives a secure message using payload vault format according to the secure messaging protocol described herein. Alias 310-1 decodes the packet and knows that the sender is 320-1.

At 330, Alias 310-1 checks whether the endpoint identified, i.e. 320-1 is on the blacklist. If it was on blacklist, the receiver discards the packet and any further steps are 335 Abort. A person of ordinary skill in the art would appreciate that this initial check before taking any further steps ensure that packets are received only from authenticated and approved senders. Any other packets are immediately discarded and are not allowed to spam the system.

Since in this scenario, Alias 320-1 is already on the whitelist, the system goes to module 340 to extract endpoint B from the payload vault transaction. The system takes the following steps: Read Encrypte payload vault message [from Endpoint B] and decoded into the following format {Alias, Encrypted Temporal Key, Encrypted Payload (EPB)}. Get Alias (TimeStamp). Select Encryption Algorithm {AES}. Extract Temporal Key. Decrypt Payload of Vault {EPB{Alias, Pub Key, Network address)}. Create Temporal Key. Encrypt pkb(temporal key). Encrypt using temporal key Etk(Payload). Send Response Packet {EPID of Alias, Pkb(TK), Etk(Payload), Eprka(Hash Signature)}.

The response packet is encrypted using a different temporal key than the one that is received. A person of ordinary skill in the art would appreciate that each exchange of messages is using a different temporal key. The Temporal keys are system generated random numbers that have different RAND seeds based on one or more of the following factors: timestamp, location and proximity. Each exchange is attributed a high level of security. By default, all exchanges are secure. A user does not have to engage in cumbersome steps to change the keys each time. The system automatically uses different temporal keys for each exchange.

Figure 4:
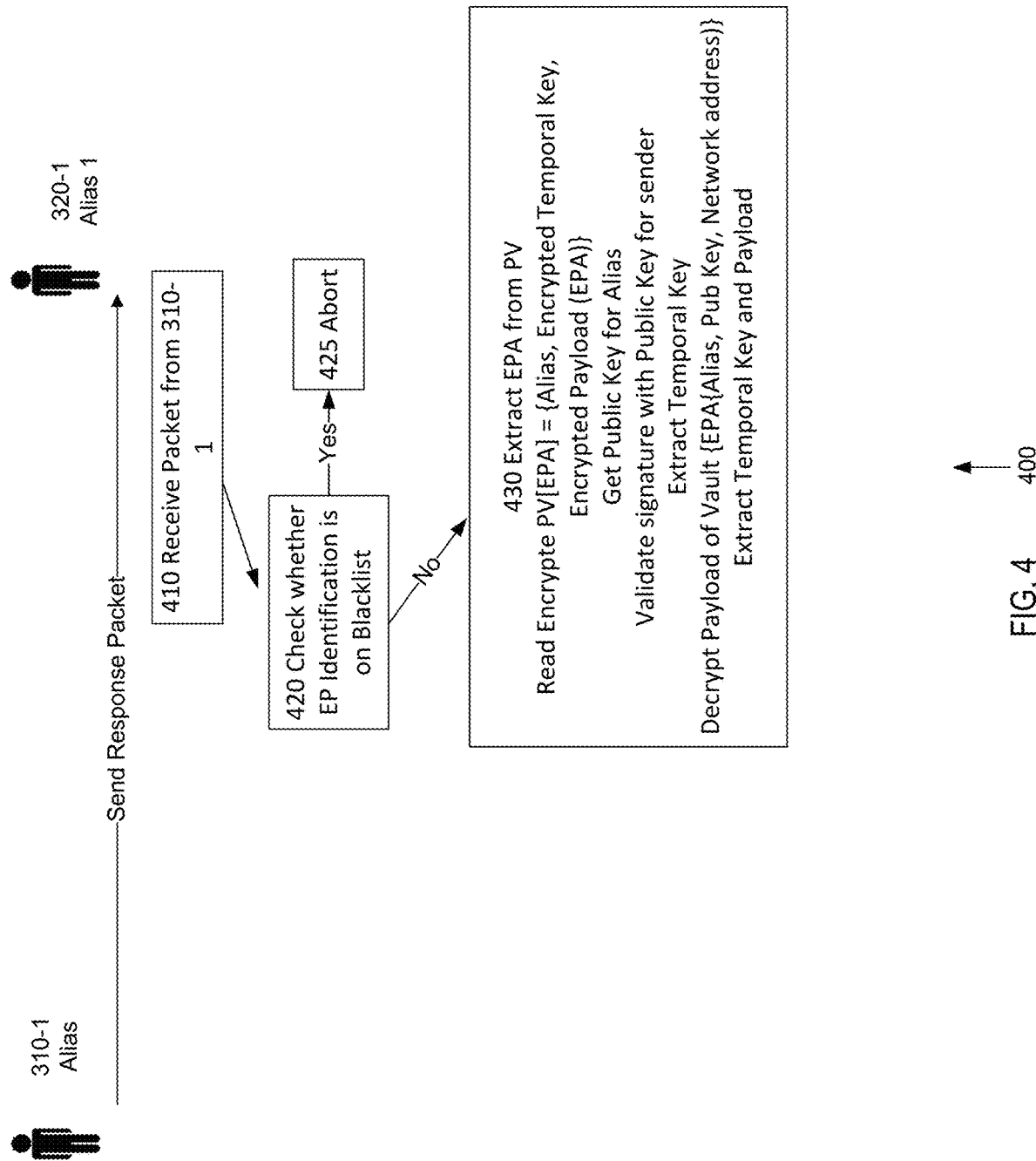
FIG. 4 is an exploded view of second stage of the secure messaging protocol, according to one embodiment.

FIG. 4 with 400 shows second stage of the secure messaging protocol that follows FIG. 3. Alias 310-1 has now sent a packet to Alias 320-1. The packet includes information in response to the initial message sent by Alias 320-1. An initial check 420 is done to determine whether the packet sender is on blacklist. If he is already on a blacklist 425, i.e. if he is listed on blacklist explicitly and not on blacklist by default of not being on the whitelist, then the packet aborts and no response is sent back.

If he is not listed on the blacklist 430, the packet is decrypted using the following sub-steps. Read Encrypte PV[EPA]={Alias, Encrypted Temporal Key, Encrypted Payload (EPA)}. Get Public Key for Alias. Validate signature with Public Key for sender that allows verification that the packet is from Alias 310-1. Only Alias 310-1 has the private key and could have encoded the packet that can be then decoded with Alias 310-1 public key. Extract Temporal Key. Decrypt Payload of Vault {EPA{Alias, Pub Key, Network address)}. Extract Temporal Key and Payload.

The extracted payload can then be handed on to the application layer for further processing. For example, the payload could be part of a document that is processed using a document editor, a video, a song, a text or multimedia messaging application. A person of ordinary skill in the art would appreciate that the security provided by the secure messaging protocol operates irrespective of the type of content that is exchanged.

Figure 5:
FIG. 5 is an exploded view of the third and final stage of the secure messaging protocol, according to one embodiment.

FIG. 5 with 500 shows the final stage of the secure messaging protocol that follows FIG. 4 to establish secure channel of communication to the private network 330. Each of Alias 310-1 and Alias 320-1 take steps to ensure that the decoded payload is now secure when at rest, i.e. at destination as well as source. A person hacking into the computing devices of Alias 310-1 and 320-1 would not be able read the content because the content is stored in a payload vault using separate temporal keys. At 510, Alias 310-1 creates temporal key for storing EncryptTK{Payload}. At 520, Alias 310-1 uses a digital vault with private key and payloads that are encrypted using different temporal keys for each conversation, i.e. Conversation 1, Conversation 2, . . . Conversation n.

Similar to what occurs at Alias 310-1, Alias 320-1 also stores using temporal keys all of the payload information using private key and a vault. At 530, Alias 320-1 creates temporal key for storing EncryptTK{Payload}. At 540, Alias 320-1 uses a digital vault with private key and payloads that are encrypted using different temporal keys for each conversation, i.e. Conversation 1, Conversation 2, . . . Conversation n.

The communication may now include higher level application protocols, including, for example, using Hyper-Text Transport Protocol ("HTTP"), Hyper-Text Transport Protocol Secure ("HTTPS") or Message Queuing Telemetry Transport ("MQTT") protocols. The device communication is encrypted using overlay Transport commands that include Transport control protocol ("TCP"), Web Sockets, MQTT or Constrained Application Protocol ("CoAP").

Figure 6:
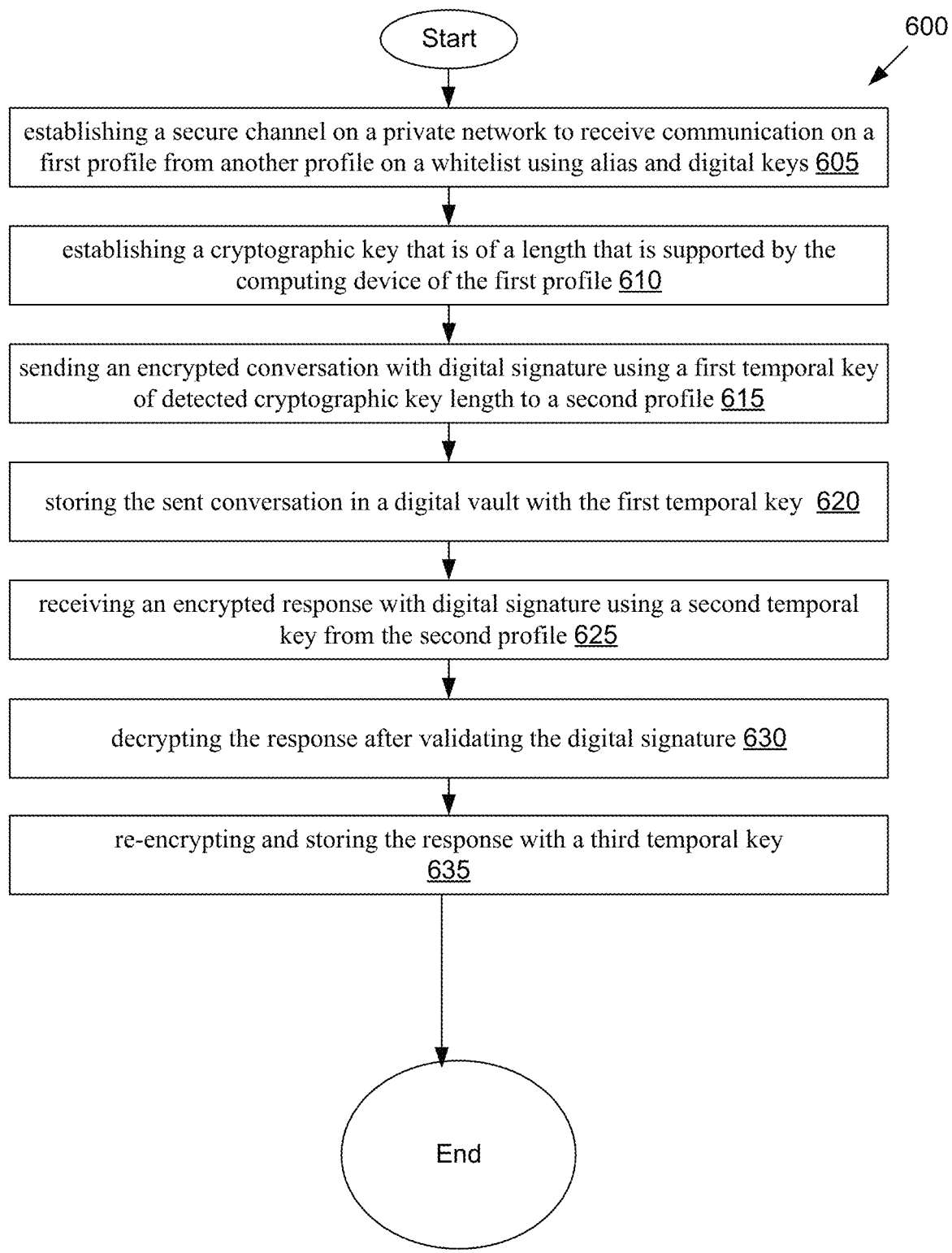
FIG. 6 shows a flowchart illustrating an example of a method of a secure messaging protocol.

FIG. 6 depicts a flowchart 600 illustrating an example of a method for secure messaging protocol. The flowchart 600 is discussed in conjunction with the environment shown in the diagram 100 in FIG. 1. At block 605, begins with establishing a secure channel on a private network to receive communication on a first profile from another profile on a whitelist using alias and digital keys. At block 610, establishing a cryptographic key that is of a length that is supported by the computing device of the first profile for the transaction. A person of ordinary skill in the art would understand that the key length is selected such that all the targeted recipients and senders can support that cryptographic key length and related operations for encoding and decoding. In one embodiment, the key length is customizable by a user within a range supportable by the computing device. At block 615, sending an encrypted conversation with digital signature using a first temporal key of detected cryptographic key length to a second profile. At block 620, storing the sent conversation in a digital vault with the first temporal key. At block 625, receiving an encrypted response with digital signature using a second temporal key from the second profile. At block 630, decrypting the response after validating the digital signature. At block 635, re-encrypting and storing the response with a third temporal key. A person of ordinary skill in the art would appreciate that the computing device triggers use of a new temporal key on each exchange as well as a different temporal key is used for local storage as well as system-wide storage on other devices.

In one embodiment, the digital vault used for storing keys is using PKCS12 key store. In one embodiment, the content of the conversations includes one or more of the following messages: Short Message Service, Multimedia Messaging Service, texting, voice, video, digital content, or any form of internet protocol-based underlay network.

In one embodiment, the payload messages stored locally or on remote computing devices are indexed for fast retrieval and access. The indexing is based on time, source or topic of conversations and context with related exchanges. A document that is recently created, edited or modified is more likely to be retrieved and hence is indexed for a faster lookup. A document that has not been accessed for days can be stored with a slightly longer retrieval process. A person of ordinary skill in the art would appreciate that database and file storing indexing techniques are applied in the context of secure objects containing payload information.

In a broad embodiment, the invention is systems and methods of securing digital conversations for its life cycle allow controlling content from its source, in transmission and at destination by encapsulating them in secure objects that comply with rules and policies of the private network. An originator of content or information can later decide to revise, edit, modify or delete that content on all locations including destination computing profiles that encompasses all of the profiles on the network. The information does not escape the secure objects. The secure objects form a circle of trust that is not breached. No one profile is at the top of the hierarchy. By de-centralization and giving the source of the information controlling power over the content, the private network operates efficiently promoting good behavior. Profiles are accountable for their actions. There is no scope for anonymity or spam.

Figure 7:
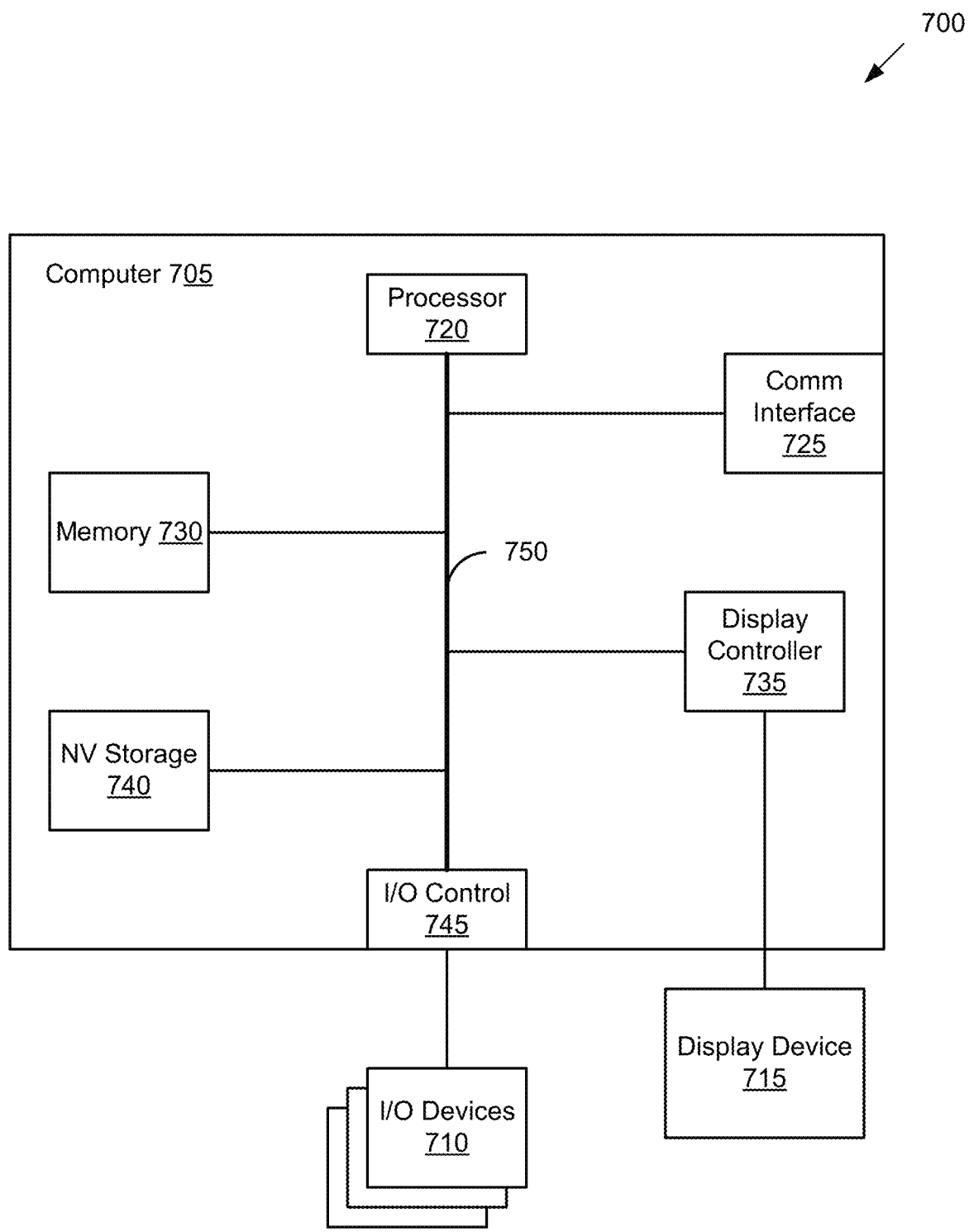
FIG. 7 is a schematic diagram of exemplary computing devices that can be used to implement the methods and systems disclosed herein, according to one embodiment.

FIG. 7 is a schematic diagram of computing device 700 that can be used to implement the methods and systems disclosed herein, according to one or more embodiments. FIG. 7 is a schematic of a computing device 700 that can be used to perform and/or implement any of the embodiments disclosed herein. In one or more embodiments, IoT device 110, SDK/API 120, Speak-to-IoT system 130, voice assistants 150, user end devices with mobile apps 170 or 180 of FIG. 1 may be the computing device 700.

The computing device 700 may represent various forms of digital computers, such as laptops, desktops, workstations, personal digital assistants, servers, blade servers, mainframes, and/or other appropriate computers. The computing device 700 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

FIG. 7 shows an example of a computing device 700 on which techniques described here can be implemented. The computing device 700 can be a conventional computer system that can be used as a client computer system, such as a wireless client or a workstation, or a server computer system. The computing device 700 includes a computer 705, I/O devices 710, and a display device 715. The computer 705 includes a processor 720, a communications interface 725, memory 730, display controller 735, non-volatile storage 740, and I/O controller 745. The computer 705 may be coupled to or include the I/O devices 710 and display device 715.

The computer 705 interfaces to external systems through the communications interface 725, which may include a modem or network interface. It will be appreciated that the communications interface 725 can be considered to be part of the computing device 700 or a part of the computer 705. The communications interface 725 can be an analog modem, integrated services for digital networks ("ISDN") modem, cable modem, token ring interface, satellite transmission interface (e.g. "direct personal computer" also known as "direct PC"), or other interfaces for coupling a computer system to other computer systems.

The processor 720 may be, for example, a conventional microprocessor such as an Intel Pentium microprocessor or Motorola power PC microprocessor. The memory 730 is coupled to the processor 720 by a bus 750. The memory 730 can be Dynamic Random Access Memory (DRAM) and can also include Static RAM (SRAM). The bus 750 couples the processor 720 to the memory 730, also to the non-volatile storage 740, to the display controller 735, and to the I/O controller 745.

The I/O devices 710 can include a keyboard, disk drives, printers, a scanner, and other input and output devices, including a mouse or other pointing device. The display controller 735 may control in the conventional manner a display on the display device 715, which can be, for example, a cathode ray tube (CRT) or liquid crystal display (LCD). The display controller 735 and the I/O controller 745 can be implemented with conventional well-known technology.

The non-volatile storage 740 is often a magnetic hard disk, an optical disk, or another form of storage for large amounts of data. Some of this data is often written, by a direct memory access process, into memory 730 during execution of software in the computer 705. One of skill in the art will immediately recognize that the terms "machine-readable medium" or "computer-readable medium" includes any type of storage device that is accessible by the processor 720 and also encompasses a carrier wave that encodes a data signal.

The computing device 700 is one example of many possible computer systems that have different architectures. For example, personal computers based on an Intel microprocessor often have multiple buses, one of which can be an I/O bus for the peripherals and one that directly connects the processor 720 and the memory 730 (often referred to as a memory bus). The buses are connected together through bridge components that perform any necessary translation due to differing bus protocols.

Network computers are another type of computer system that can be used in conjunction with the teachings described here. Network computers do not usually include a hard disk or other mass storage, and the executable programs are loaded from a network connection into the memory 730 for execution by the processor 720. A Web TV system, which is known in the art, is also considered to be a computer system, but it may lack some of the components shown in FIG. 7, such as certain input or output devices. A typical computer system will usually include at least a processor, memory, and a bus coupling the memory to the processor.

Though FIG. 7 shows an example of the computing device 700, it is noted that the term "computer system," as used here, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. An example of a computer system is shown in FIG. 7.

The memory can include, by way of example but not limitation, random access memory (RAM), such as dynamic RAM (DRAM) and static RAM (SRAM). The memory can be local, remote, or distributed. As used here, the term "computer-readable storage medium" is intended to include only physical media, such as memory. As used here, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory here. Even when software is moved to the memory for execution, the processor will typically make use of hardware registers to store values associated with the software, and local cache that, ideally, serves to speed up execution. As used here, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

Figure 8:
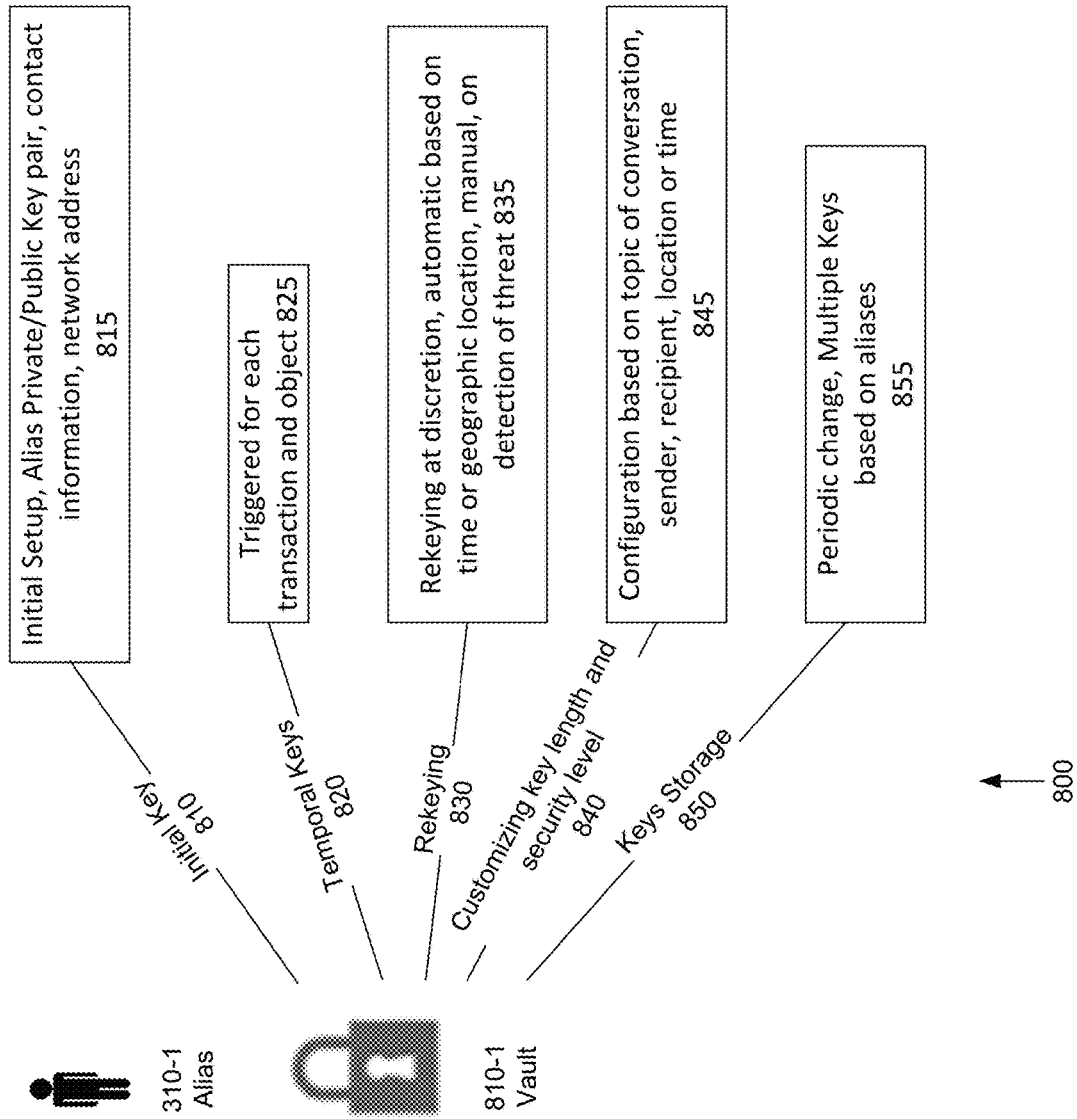
FIG. 8 is a staged level diagram illustrating different types of digital vaults at a computing device of a profile and the corresponding parameters of the environment and/or setup.

FIG. 8 shows different stages and triggers with regards to keys and payload on one of the computing device associated with an alias. To begin with a private network with Alias 310-1 includes a digital vault 810-1. An initial key and setup stage is at 810. During the initial setup information 815 regarding the alias that owns the computing device is added with private/public key pair information, contact information and its own network address.

During exchanges, temporal keys 820 are generated. Temporal keys are needed for each exchange and each local storage. A module works on temporal key management 825 that is triggered for each transaction exchange and generated for all objects containing information related to the system or user related data.

Rekeying 830 is an important module that enhances the security of the private network and all information exchanged on it. Rekeying is triggered at 835 on user discretion, automatic based on time or geographic location, manually or on detection of threat. Rekeying can occur for portion of data exchanges, entire computing device for that profile or network wide on all computing devices. In one embodiment, the digital vault operates using multiple keys. Different private keys are associated with different aliases that reside on the computing device. In one embodiment, different private keys are associated with different portions of the encrypted payloads. For example, in one embodiment, a global private key may have access to all of the payload objects. In one embodiment, a temporal key is associated with each transactional object that operates in conjunction with a private key to keep the data secure. In one embodiment, the vault is equivalent of a smart wallet. The smart wallet may be operated by a user or a group of users. In one embodiment, the temporal keys are associated with a cryptocurrency. In one embodiment, the vault and key store are implemented using blockchain.

The vault 810-1 also has a module to customize key length and security level 840 that is based on configuration 845 on topic of conversation, sender, recipient, location or time based. For example, some topics of conversation may be of a sensitive nature that require a higher security level. Other conversations may be casual where the security level could be minimum of that offered by the system. A user may configure the level of security based on topic of conversation. For example if a sender is user's doctor or attorney then the user may configure all conversations with those senders to be at the highest security level. If the location is sensitive, for example, research area including highly confidential information in a building, then based on that location, the security level of all conversations would be very high. If a user knows that for a given time period he is going to be involved in highly sensitive work that requires high level of security, he may turn on time-based security level for that period of time.

The vault 810-1 may operate in conjunction with a key store 850. In one embodiment, the key store 850 is part of the vault 810-1. The key store manages 855 periodic change and multiple keys based on aliases. The system automatically triggers key changes based on a certain lapse of time. Different objects have different temporal keys that need to be indexed securely in a key store. In one embodiment, the digital vault is a secure vault using PKCS12 key store.

Figure 9:
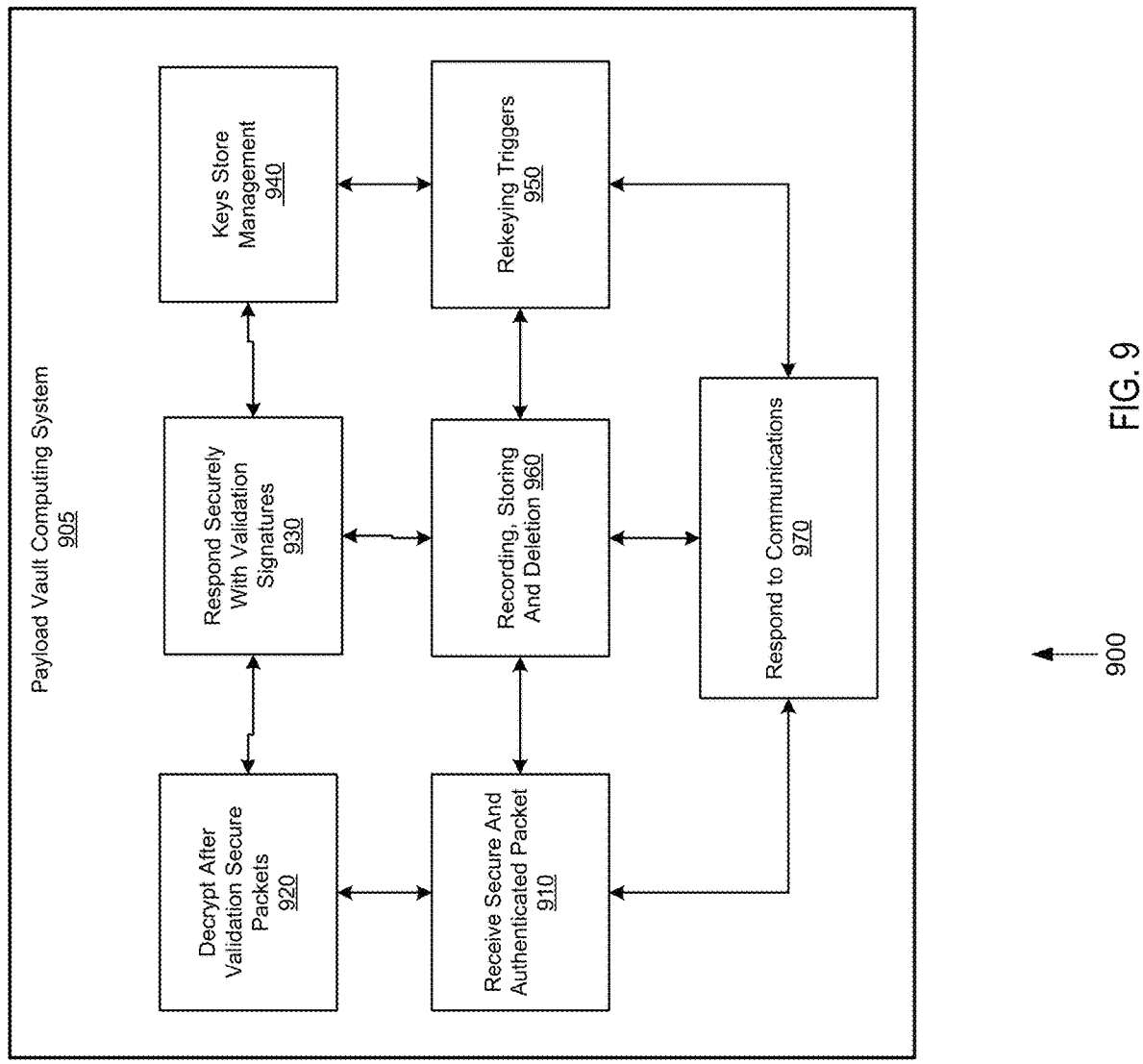
FIG. 9 is an exploded view of an end point profile computing device with different subroutines according to one embodiment.

FIG. 9 shows an exploded view of a payload vault 905 on a computing device according to one embodiment of the proposed solution. Module 970 is used to respond to communications. All communications are secure and encrypted communications that are received from senders on a whitelist for the private network. All communications from entities not on whitelist or explicitly residing on a blacklist are discarded and further steps are aborted. Module 910 receives secure and authenticated packets. After an initial check as to sender and verification of digital signature the packet information is moved to other modules for further processing. Module 920 decrypts the secure packets after validation. Different applications receive the payload information from the decrypted packets. Checks are also performed as to whether a response is needed or not. Module 930 responds securely with validation signatures. Response packets are encrypted with private key for authentication and include hash of digital signatures to verify that the packet is not corrupt during transmission. Module 940 is used in Key Store Management. As described earlier, key store is used for different temporal key generation for each exchange as well as for local storing of payloads. Module 950 monitors any rekeying triggers and sets off rekeying. Module 960 is used for recording, storing and deletion. Temporal keys are used for recording, storing and deletion of all information. Because information is always within a secure payload object, the information can be modified or deleted locally as well as at all recipients on the network. In one embodiment, deleting one or more exchanges originating from another profile from a private network is triggered when a trust relationship with that profile is revoked. In one embodiment, a user may manually delete the conversation that triggers automatic deletion of all related exchanges from all the computing devices on the private network. In one embodiment, payload vault 905 discards packets that do not have authenticated sender information that prevents anonymous conversations on the private network.

In one embodiment, securing digital conversations for its life cycle is implemented using a blockchain platform. The blockchain platform provides different services that are modular, customized and flexible for a given set of users. For example, the blockchain platform provides modular services for authentication, encryption, different applications etc. The private network supporting securing digital conversations for its life cycle can pick and choose to modularly work with a blockchain platform to provide additional features and services to its aliases and the end-users. A person of ordinary skill in the art would understand that the private network supporting securing digital conversations for its life cycle can be implemented at personal level as well as for an enterprise.

A person of ordinary skill in the art would appreciate that communicating through the private networks supporting securing digital conversations for its life cycle changes the perspective and use of communicating, freely associating and use of internet. An end-user i.e. owner of a computing device with the use of smart and intelligent aliases has full control on how to associate and communicate with different users.

Several components described here, including clients, servers, and engines, can be compatible with or implemented using a cloud-based computing system. As used here, an overlay network including, for example, a peer to peer network, is a system that provides computing resources, software, and/or information to client systems by maintaining de-centralized services and resources that the client systems can access over a communications interface, such as a network. A person of ordinary skill in the art would understand that different modules or components described herein could be implemented using a cloud-based computing system. Such systems can involve a subscription for services or use a utility pricing model. Users can access the protocols of the private network through a web browser or other container application located on their client system.

The invention disclosure describes techniques that those of skill in the art can implement in numerous ways. For instance, those of skill in the art can implement the techniques described here using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used here, the term 'processor' refers to one or more devices, circuits, and/or processing cores configured to process data, such as computer program instructions.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described here relate to apparatus for performing the operations. The apparatus can be specially constructed for the required purposes, or it can comprise a general-purpose computer selectively activated or reconfigured by a computer program stored in the computer. Such a computer program may be stored in a computer-readable storage medium, such as, but is not limited to, read-only memories (ROMs), random access memories (RAMS), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus. Although the foregoing implementations have been described in some detail for purposes of clarity of understanding, implementations are not necessarily limited to the details provided.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures.

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tapes, disks, integrated circuits, and servers. The instructions are operational when executed by the processor to direct the processor to operate in accord with some embodiments. Those skilled in the art are familiar with instructions, processor(s), and storage medium.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The structures and modules in the figures may be shown as distinct and communicating with only a few specific structures and not others. The structures may be merged with each other, may perform overlapping functions, and may communicate with other structures not shown to be connected in the figures.

The invention claimed is:

1. A method of securing digital conversations for its life cycle, comprising:
   establishing a secure channel on a private network to receive communication on a first profile from another profile on a whitelist using an alias for the first profile and digital keys for the first profile;
   establishing a cryptographic key that is of a length that is supported by a computing device of the first profile;
   sending an encrypted conversation with a digital signature using a first temporal key of the established cryptographic key length to a second profile;
   storing the sent conversation in a digital vault with the first temporal key;
   receiving an encrypted response with digital signature using a second temporal key from the second profile;
   decrypting the response after validating the digital signature with the second temporal key;
   re-encrypting the response with a third temporal key;
   storing the re-encrypted response in the digital vault with the third temporal key.

2. The method of claim 1, further comprising:
   rekeying the digital keys of one or more profiles is triggered using one or more of the following: at discretion, automatic based on a time or a geographic location, manual, on detection of a threat.

3. The method of claim 2, further comprising: rekeying all the profiles on the private network.

4. The method of claim 1, wherein the cryptographic key length is customizable by a user within the range supported by the computing device.

5. The method of claim 1, wherein the digital vault is a smart wallet using multiple keys.

6. The method of claim 1, further comprising:
   preventing anonymous conversations on the private network.

7. The method of claim 1, wherein the digital vault is a secure vault using PKCS12 key store.

8. A system of securing digital conversations for its life cycle, comprising:
   a private network comprising of one or more profile computing device;
   a first profile computing device configured to:
      establish a secure channel on a private network to receive communication from another profile on a whitelist using an alias for the first profile and digital keys for the first profile;
      establish a cryptographic key that is of a length that is supported by a computing device of the first profile;
      send an encrypted conversation with digital signature using a first temporal key of the established cryptographic key length to a second profile;
      receive an encrypted response with digital signature using a second temporal key from the second profile;
      decrypt the response after validating the digital signature with the second temporal key;
      re-encrypt the response with a third temporal key;
   a digital vault on the first profile computing device configured to:
      store the sent conversation with the first temporal key;
      store the re-encrypted response with the third temporal key.

9. The system of claim 8, wherein the private network further configured to:
   rekey the digital keys of one or more profiles is triggered using one or more of the following:
   at discretion, automatic based on a time or a geographic location, manual, on detection of a threat.

10. The system of claim 9, wherein the private network further configured to: rekey all the profiles on the private network.

11. The system of claim 8, wherein the cryptographic key length is customizable by a user within the range supported by the computing device.

12. The system of claim 8, wherein the digital vault is a smart wallet using multiple keys.

13. The system of claim 8, wherein the private network is further configured to:
   prevent anonymous conversations.

14. The system of claim 8, wherein the digital vault is a secure vault using PKCS12 key store.

* * * * *